Nov. 10, 1925.  
W. T. GORTON  
1,560,564  
COMBINATION MOUNT FOR MACHINE GUNS  
Filed Aug. 20, 1925  2 Sheets-Sheet 1
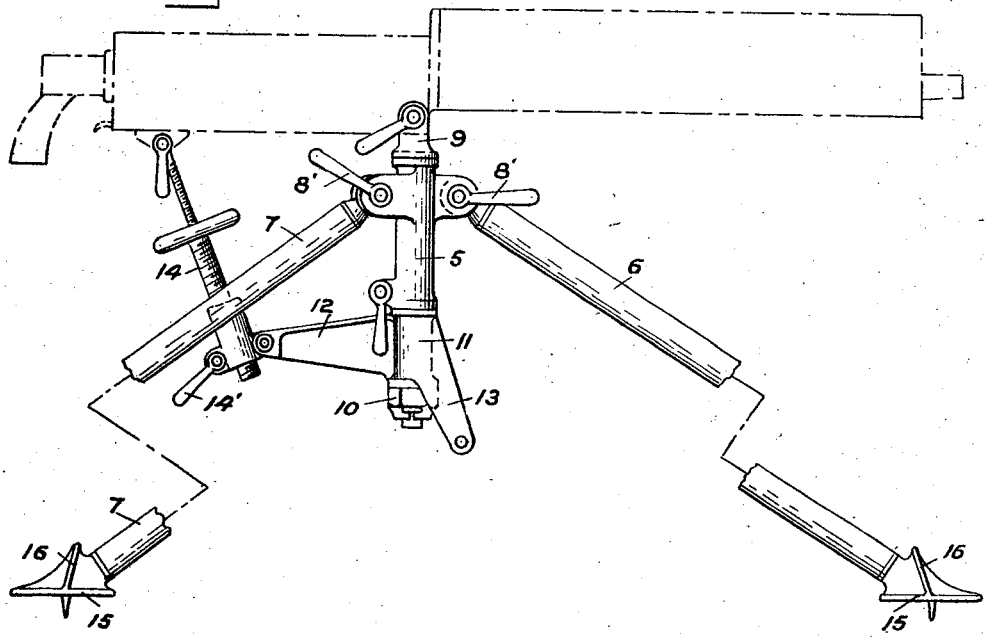
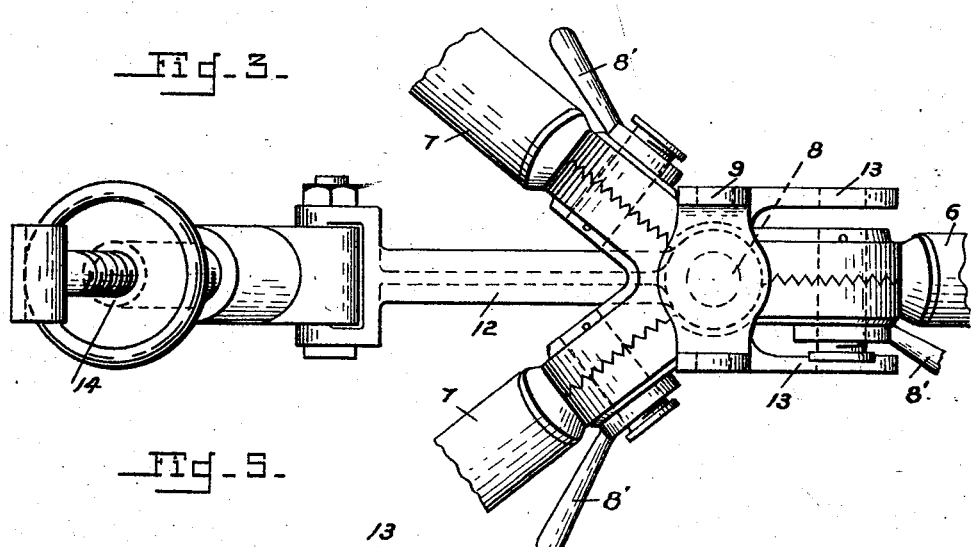
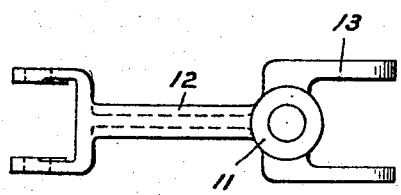
Inventor  
Walter T. Gorton  
By W. N. Roach  
Attorney

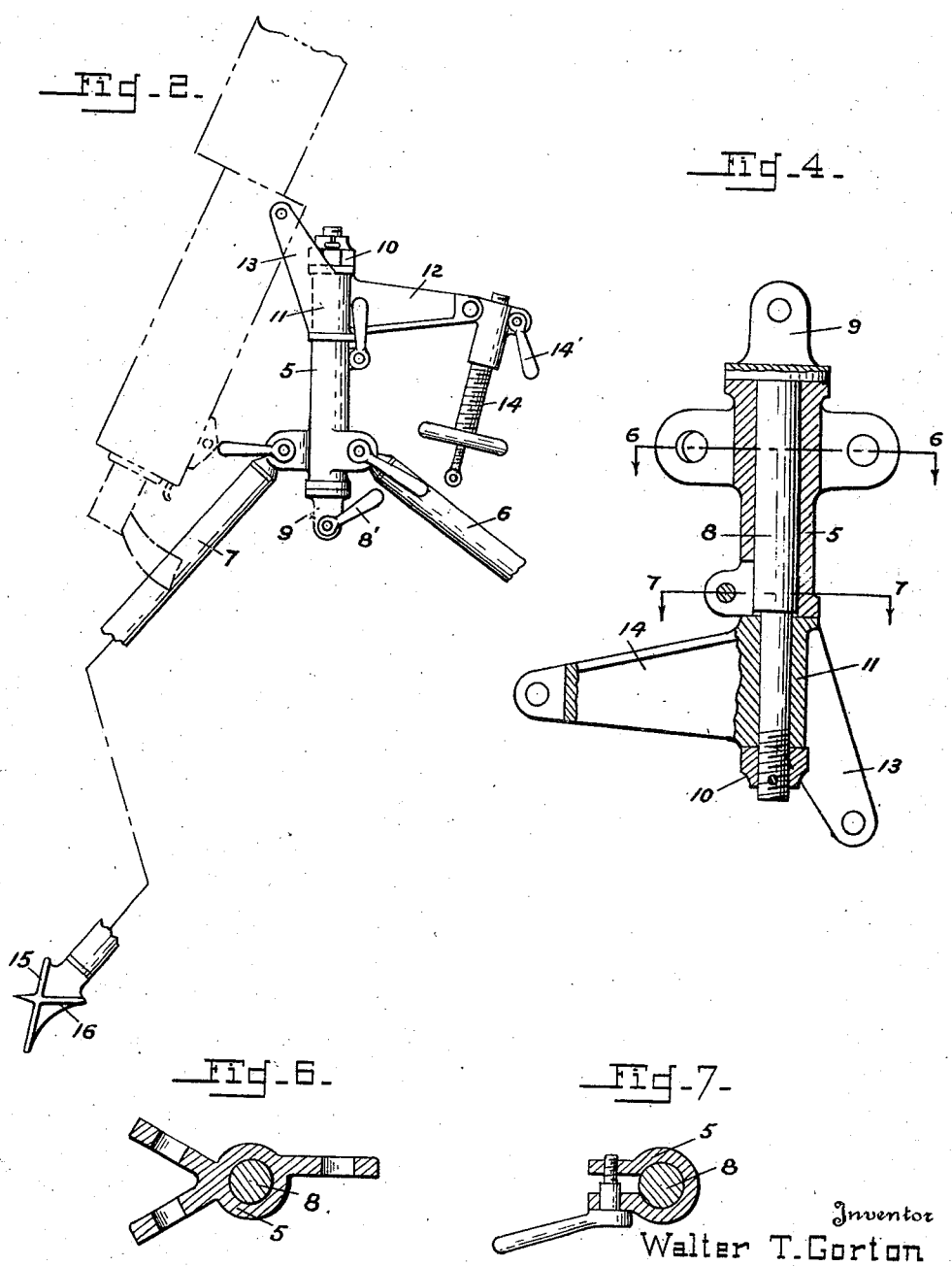

Patented Nov. 10, 1925.

1,560,564

UNITED STATES PATENT OFFICE.

WALTER T. GORTON, OF THE UNITED STATES ARMY.

COMBINATION MOUNT FOR MACHINE GUNS.

Application filed August 20, 1925. Serial No. 51,465.

(GRANTED UNDER THE ACT OF MARCH 3, 1883; 22 STAT. L. 625.)

*To all whom it may concern:*

Be it known that I, WALTER T. GORTON, U. S. Army, a citizen of the United States, and a resident of Springfield, county of Hampden and State of Massachusetts, have invented an Improvement in Combination Mounts for Machine Guns, of which the following is a specification.

The invention described herein may be used by the Government, or any of its officers or employees in prosecution of work for the Government, or by any other person in the United States, without payment to me of any royalty thereon, in accordance with the act of March 3, 1883.

The subject of this invention is a combination mount for machine guns.

The principal object of the invention is to provide a tripod which will be suitable for mounting a machine gun for normal low angle firing against ground targets as well as for high angle firing against aircraft. In the former case, it is desirable from the standpoint of protection to the gun crew and to secure stability for overhead fire that the gun be mounted as low as possible while in the latter case a higher mount is essential to proper aiming and manipulation by the gunner.

To secure these features without sacrifice of simplicity, compactness, stability and light weight, I provide a tripod head in which is mounted a stem having on both ends a yoke to trunnion a gun. The legs of the tripod which are of equal length are adjustably attached at one end of the head so that by simply inverting the tripod adjustment to a low or high mounting is obtained. The feet of the legs are especially shaped to provide for alternate mounting.

To these and other ends, my invention consists in the construction, arrangement, and combination of elements, described hereinafter and pointed out in the claims forming a part of this specification.

A practical embodiment of the invention is illustrated in the accompanying drawings, wherein:

Fig. 1 is a view in side elevation of a tripod constructed in accordance with the invention and adjusted for low angle firing;

Fig. 2 is a similar view of the mount adjusted for high angle firing;

Fig. 3 is a fragmentary plan view;

Fig. 4 is a vertical sectional view of the tripod head;

Fig. 5 is a plan view of the lower member of the tripod;

Fig. 6 is a sectional view on the line 6—6 of Fig. 4; and

Fig. 7 is a sectional view on the line 7—7 of Fig. 4.

Referring to the drawings by numerals of reference:

The tripod comprises a central head 5 to one end of which are attached by serrated joints a front leg 6 and a pair of trail legs 7—7. All of the legs are of equal length and are individually adjustable to provide for maintaining the axis of traverse vertical on uneven ground, for folding, and for inverting the tripod.

In the normal application of the tripod for mounting a gun for low angle firing against ground targets the joints of the legs will be at the upper end of the tripod head. Rotatable in the head is a stem 8 provided with a yoke 9 for trunnioning the gun. Mounted on the lower end of the stem and held against the tripod head by a nut 10 is a member 11 including an arm 12 and an auxiliary yoke 13. Attached to the outer end of the arm 12 is an elevating mechanism 14 of usual construction and adapted to support the rear end of the gun. When connected to the gun it serves to confine traversing movement between the trail legs and obviates the necessity of a cradle because the thrust is resisted by the entire length of the tripod head. By virtue of the split trail and the particular disposition of the elevating mechanism the vertical distance between the trunnion pin and the juncture of the legs with the tripod head may be reduced to a minimum thereby providing a low stable mounting.

In adjusting the tripod for mounting the gun for high angle firing against aircraft it is simply inverted and the gun trunnioned in the auxiliary yoke 13, the gain in height of the mount with the same spacing of the legs which is effected by this arrangement being readily apparent. The elevating mechanism is not used in this class of fire and hangs idly from the arm 12.

The feet of the tripod legs are specially shaped to provide for alternate positions on the ground. Each foot includes shoes 15 and 16 approximately perpendicularly bisecting each other and respectively resting upon the ground in the low and high mount of the tripod. In each case one portion of the opposite shoe forms a spade for entering the ground.

Clamps for binding the elevating screw and yoke stem are provided as shown at 14' and 8'.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. A combination mount for machine guns embodying a tripod head, legs of equal length adjustably attached to the head at one end thereof, a stem rotatable in the head, a yoke on both ends of the stem above and below the head, the upper yoke adapted to trunnion a gun for low angle firing, and the lower yoke adapted when the tripod is inverted to trunnion a gun for high angle firing, and an arm forming a part of a lower yoke for carrying an elevating mechanism.

2. A combination mount for machine guns embodying a tripod head, legs of equal length adjustably attached to the head at one end thereof, a stem rotatable in the head, a yoke on both ends of the stem above and below the head, the upper yoke adapted to trunnion a gun for low angle firing, and the lower yoke adapted when the tripod is inverted to trunnion a gun for high angle firing.

3. A combination mount for machine guns embodying a tripod head, legs of equal length adjustably attached to the head at one end thereof, a yoke rotatably mounted at each end of the head, the yoke adjacent the attachment of the legs adapted to trunnion a gun for low angle firing and the other yoke adapted when the tripod is inverted to trunnion the gun for high angle firing.

4. A combination mount embodying an invertible tripod having its legs adjustably attached at one end of the tripod head, and means on either end of the tripod head for trunnioning a gun.

5. An invertible tripod embodying a head, means on either end thereof for trunnioning a gun, and legs attached offcenter of the head to position the gun trunnioning means at different heights from the ground.

6. A leg for invertible tripods and the like having its feet formed by shoes approximately perpendicular to each other, one portion of each shoe adapted to enter the ground when the other shoe rests upon the ground.

WALTER T. GORTON.